US008054480B2

(12) United States Patent
Mizobuchi

(10) Patent No.: US 8,054,480 B2
(45) Date of Patent: Nov. 8, 2011

(54) IMAGE PROCESSING APPARATUS

(75) Inventor: Yuki Mizobuchi, Yao (JP)

(73) Assignee: Sharp Kabushiki Kaisha, Osaka (JP)

( * ) Notice: Subject to any disclaimer, the term of this patent is extended or adjusted under 35 U.S.C. 154(b) by 706 days.

(21) Appl. No.: 12/163,090

(22) Filed: Jun. 27, 2008

(65) Prior Publication Data

US 2009/0009788 A1 Jan. 8, 2009

(30) Foreign Application Priority Data

Jul. 4, 2007 (JP) ................................ 2007-176576

(51) Int. Cl.
*G06F 3/12* (2006.01)

(52) U.S. Cl. ...... 358/1.13; 358/1.1; 358/1.15; 358/1.18; 358/448

(58) Field of Classification Search ........................ None
See application file for complete search history.

(56) References Cited

U.S. PATENT DOCUMENTS 5,301,036 A * 4/1994 Barrett et al. ................. 358/448
5,383,754 A * 1/1995 Sumida et al. .................. 412/11
5,638,181 A * 6/1997 Kubo et al. ................... 358/296
7,006,240 B1 2/2006 Mori
7,643,187 B2 * 1/2010 Tagawa ......................... 358/527
7,852,520 B2 * 12/2010 Iida .............................. 358/474
2005/0094226 A1 * 5/2005 Burch ........................... 358/498
2007/0187882 A1 * 8/2007 Tokashiki .................... 270/1.01
2007/0212099 A1 * 9/2007 Hoshino et al. ................. 399/81

FOREIGN PATENT DOCUMENTS

JP 07-131630 5/1995
JP 2522792 8/1996
JP 09-247372 9/1997
JP 10-224606 8/1998
JP 11-038690 2/1999
JP 2003-189027 7/2003
JP 2007-28064 2/2007

* cited by examiner

*Primary Examiner* — James A Thompson
*Assistant Examiner* — Miya J Cato
(74) *Attorney, Agent, or Firm* — Renner, Otto, Boisselle & Sklar, LLP

(57) ABSTRACT

The present invention provides an image processing apparatus for allowing a user to easily understand a direction of setting a document intuitively, in which, when two single sided documents are printed on front and rear faces of a recording sheet, a display section is caused to display an image showing a direction of setting the documents and a message showing whether or not the setting direction of the documents is different between the first and second documents at the time of reading the two single sided documents, so that the user is able to understand the direction of setting the documents intuitively.

5 Claims, 9 Drawing Sheets

OFFICE MODEL (SET DOCUMENT VERTICALLY)

OFFICE MODEL (SET DOCUMENT VERTICALLY)

CONVENIENCE STORE MODEL (SET DOCUMENT LATERALLY)

IMAGE PROCESSING APPARATUS

BACKGROUND OF THE INVENTION

1. Field of the Invention

The present invention relates particularly to an image processing apparatus in which a direction of setting a document or a recording sheet can be understood when single sided documents are subjected to double sided printing.

2. Description of the Related Art

In image processing apparatuses, there are two kinds of directions of setting a document and a recording sheet, including a portrait and a landscape, and therefore it is impossible to respond to all requirements. Thus, conventional image processing apparatuses have responded in such a way that an image is rotated so as to be able to obtain a printed object regardless of at least directions.

However, as regards existence/absence and directions of the image rotation, in particular, when single sided documents are subjected to double sided printing, unless it is strictly recognized that in which direction information on a document is written, that is, whether the document is a laterally written document for a vertically long paper (portrait document) or a laterally written document for a laterally long paper (landscape document), it has been difficult for a user to obtain desired rotation result.

Hence, Japanese Patent Laid-Open No. H07-13160 proposes a technical content that at the time of performing double sided printing with single sided documents, an inputted document image is rotated based on an orientation of a document set by a user and an inputted binding direction.

In an image processing method disclosed in the Japanese Patent Laid-Open No. 07-13160, although a document image is rotated depending on the orientation of the set document, there is a problem that it is difficult for general users to understand how to set orientations of each first and second document.

Moreover, in recent years, although multifunctional peripherals for offices have been used for convenience stores, it is standard in multifunctional peripherals installed in convenience stores based on the agreement in a convenience-store industry, that documents are set in a lateral direction even when they are portrait documents (vertically long documents), different from those for offices, thus it has been further difficult for users who are familiar with the machines for offices to understand an orientation of setting a document.

In view of the above described circumstance, it is an object of the present invention to provide an image processing apparatus in which a user can easily understand a direction of setting a document intuitively.

SUMMARY OF THE INVENTION

In order to accomplish the aforementioned object, an image processing apparatus according to the present invention includes a reading section for reading an image of a document; an operating section for setting orientation information of the document and a binding direction of a recording sheet; a display section for displaying an operation instruction and an operation state in the operating section; an image forming section for forming the image on the recording sheet; and a control section for controlling the image forming section and the display section depending on an operating input from the operating section, wherein when two single sided documents are subjected to double sided printing on front and rear faces of the recording sheet, the control section causes the display section to display an image showing a setting direction of the documents and a message showing whether or not the setting direction of the documents is different between the first and second documents, at the time of reading the two single sided documents.

According to the aforementioned configuration, each time a user sets two single sided documents on a document table, the display section is caused to display “an image showing a setting direction of the documents” and “a message showing whether or not the setting direction of the documents is different between the first and second documents”, thus the user is able to understand the setting direction of the documents intuitively.

Here, modes displayed on the display section include character information or graphics. In particular, display with icons allows a user to easily understand a setting direction of documents intuitively. The icon is a graphic which is symbolized so that instructions and orders to be given to a computer are easily understood, and the icon display makes it possible to understand visually.

Moreover, when setting operation is made so that two portrait documents (vertically long documents) are subjected to a vertical binding (binding is made at a left-side or a right-side vertical edge) in the operating section, the control section causes the display section to display to set upper sides (upper horizontal edges) of the two portrait documents (vertically long documents) in a same direction (lateral direction).

Thereby, at the time of printing the two portrait documents (vertically long documents) on the front and rear faces of a recording sheet, when a vertical binding (printing on the front and rear faces of the recording sheet with the upper sides being in a same direction) is set, ways of setting the documents are adjusted to have a same direction, thus the user is able to understand the setting direction of the documents intuitively.

In particular, in image processing apparatuses installed in convenience stores, it is standard to set A4-portrait documents laterally, and in such image processing apparatuses, it is effective to cause the display section to display as described above.

Moreover, when setting operation is made so that two portrait documents (vertically long documents) are printed on the front and rear faces of a recording sheet with upper sides being in a same direction, the control section causes the display section to display to set the upper sides of the two portrait documents (vertically long documents) in a same direction (lateral direction).

Thereby, at the time of printing the two portrait documents on the front and rear faces of the recording sheet, when it is set so that the printing on the front and rear faces is performed with the upper sides being in the same direction, by displaying that a setting direction of the documents is also set so as to be in a same direction, the user is able to understand the setting direction of the documents intuitively. In particular, it is effective for multifunctional peripherals installed in convenience stores, in which it is standard that A4-portrait documents are set laterally.

Moreover, the control section causes the display section to differentiate display contents between a case where a portrait document (a vertically long document) is set as a standard mode, and a case where a landscape document (a laterally long document) is set as a standard mode.

According to the aforementioned configuration, in image processing apparatuses installed in convenience stores, it is standard in its industry that A4-documents are set laterally so as not to cause the A4-documents to be set horizontally, and thus by switching display modes between apparatuses for offices and for convenience stores, it is possible to perform a display more effectively.

As described above, each time a user sets two single sided documents on a document table, the display section is caused to display "an image showing a setting direction of the documents" and "a message showing whether or not the setting direction of the documents is different between the first and second documents", thus the user is able to understand the setting direction of the documents intuitively.

DETAILED DESCRIPTION OF THE PREFERRED EMBODIMENTS

Figure 1:
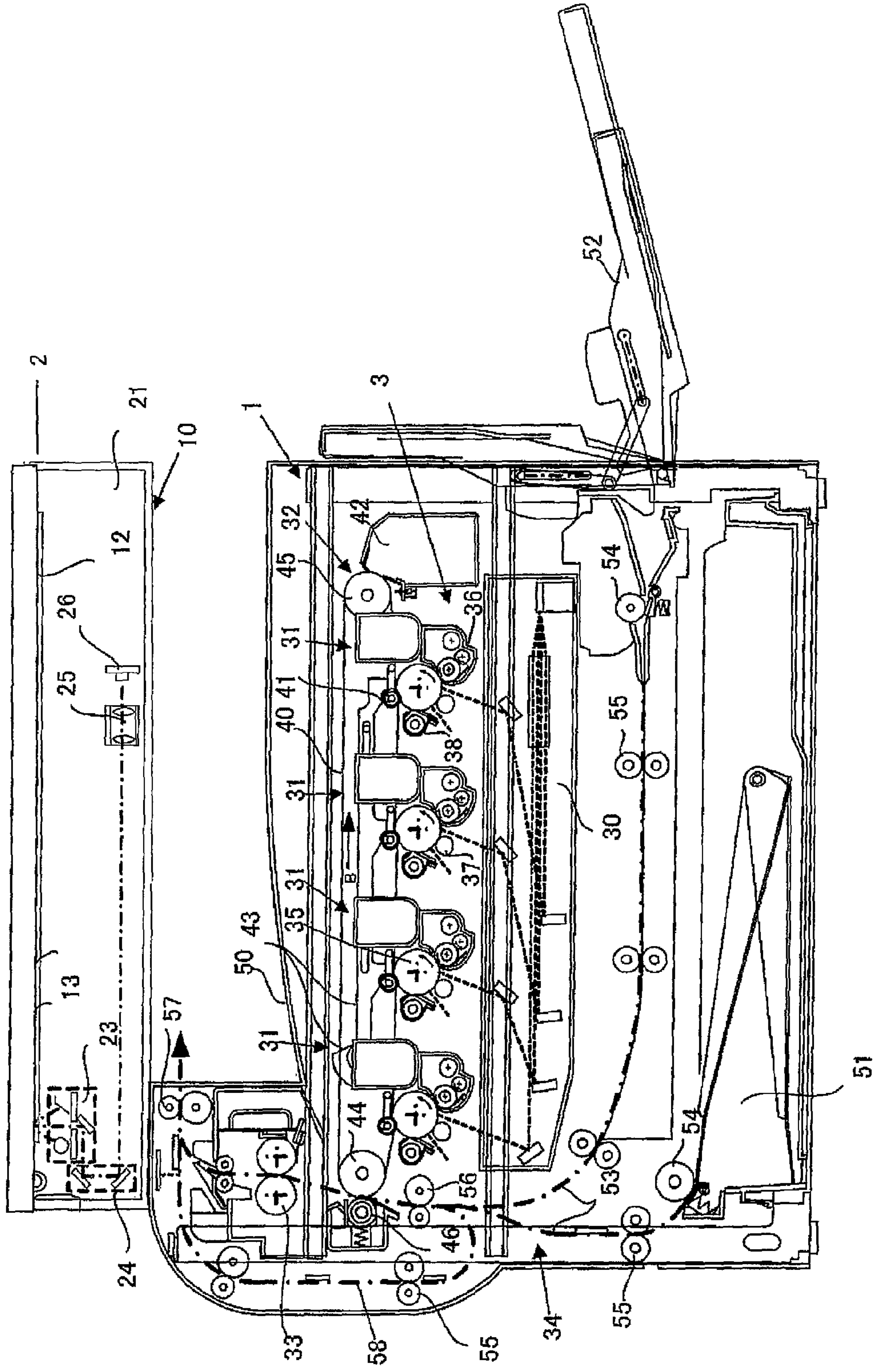
FIG. 1 is an overall structural diagram of an image processing apparatus of an embodiment in the present invention.
Figure 2:
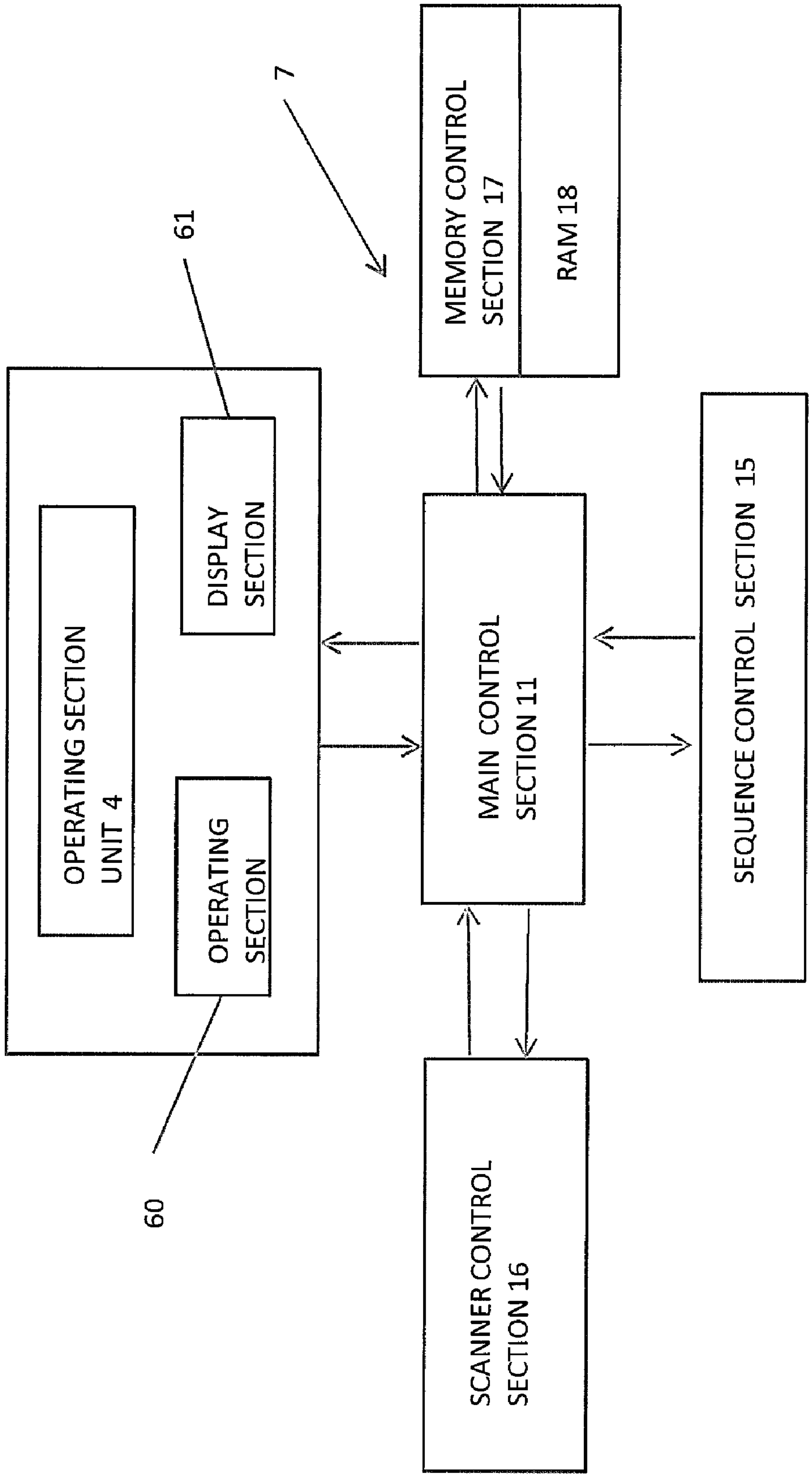
FIG. 2 is a control block diagram of the image processing apparatus.

Now, referring to the drawings, preferred embodiments of the present invention will hereinafter be described. FIG. 1 is an example of the embodiments of the present invention, and is an overall configuration diagram of an image processing apparatus according to an embodiment of the present invention.

The image processing apparatus, which is a multifunctional peripheral for performing a copy mode, a print mode, a scanner mode, and a facsimile mode, includes in a cabinet 1, an image reading section 2 for reading a document and inputting image data, an image forming section 3 for processing the image data to print them, an operating section unit 4 for input operation, and a control section 7 for controlling a display section 61 of the operating section unit 4 and the image forming section 3 to perform processing of the image data depending on the mode.

The image reading section 2 includes a scanner section 10 which is disposed above the cabinet 1, a document table 12 made of platen glass, which is disposed above the scanner section 10, and a document cover 13 covering the document table 12, which is adapted to be opened and closed, and, if necessary, an automatic document feeding apparatus.

The scanner section 10 includes a reading section 21, in which a reading area is formed at one side of the document table 12 and a scanning unit 23 of the reading section 21 is positioned so that the front face (lower side surface) of the document is read when it is placed on the document table 12. The scanning unit 23 is moved to be placed at a reading position, and the front face of the document is irradiated from below the document table 12 by an exposure lamp of the scanning unit 23. The reflected light from the document is guided to an image forming lens 25 by each reflection mirror of the scanning unit 23. The reflected light from the document is concentrated to a CCD 26 by the image forming lens 25. An image on the front face of the document is formed on the CCD 26. Thus, the image on the front face of the document is read.

When the image on one side of the document has been read, the image data thereof is inputted into the control section 7. The control section 7 includes an image processing section, and the image data is subjected to various image processing by the image processing section, then the image data is outputted to the image forming section 3.

The image forming section 3 prints a color image or a black-and-white image on a recording sheet based on the inputted image data.

The image forming section 3 includes a laser scanning unit 30, four image stations 31, an intermediate transfer belt unit 32, a fixing apparatus 33, and a feeding apparatus 34.

Each image station 31 respectively forms a color image corresponding to each color of black, cyan, magenta, and yellow. Each image station 31 includes a photoreceptor drum 35, a developing apparatus 36, a charging apparatus 37, a cleaning apparatus 38, and a neutralization apparatus (not shown).

The photoreceptor drum 35 is driven to rotate in one direction, the cleaning apparatus 38 cleans the remaining toner on the surface of the photoreceptor drum 35, and the neutralization apparatus removes electrical charges on the surface of the photoreceptor drum 35. The charging apparatus 37 causes the surface of the photoreceptor drum 35 to be electrically charged in a uniform fashion.

In the laser scanning unit 30, laser light is modulated based on the image data inputted from the image reading section and the like, and this laser light is used to repeatedly scan the surface of the photoreceptor drum 35 in the main scanning direction to form an electrostatic latent image on the surface of the photoreceptor drum 35.

The developing apparatus 36 provides toner to the surface of the photoreceptor drum 35, develops an electrostatic latent image, and forms a toner image on the surface of the photoreceptor drum 35.

The intermediate transfer belt unit 32 includes an intermediate transfer belt 40, an intermediate transfer roller 41, a transfer belt cleaning apparatus 42, and a tension mechanism 43. The intermediate transfer belt 41 is disposed above each photoreceptor drum 35 and is looped over a drive roller 44 and a driven roller 45 to rotate in the direction indicated by an arrow B.

The intermediate transfer roller 41 is disposed opposite to the photoreceptor drum 35 by sandwiching the intermediate transfer belt 40, and is applied with a transfer bias voltage. A voltage of the opposite polarity to that of the toner is applied by the intermediate transfer roller 41, and thereby the toner image on the surface of the photoreceptor drum 35 is transferred onto the intermediate transfer belt 40. The toner images of each color are laminated onto the intermediate transfer belt 40 to form a combined toner image of multiple colors.

The transfer roller 41 is disposed in pressurized contact with the intermediate transfer belt 40, and is applied with a voltage of the polarity opposite to that of the toner. The toner image on the intermediate transfer belt 40 is transferred by a transfer roller 46 to a recording sheet which has been fed between the transfer roller 46 and the intermediate transfer belt 40. The toner remaining on the intermediate transfer belt 40 is removed by the transfer belt cleaning apparatus 42.

The toner image transferred to the recording sheet is heated and pressurized by the fixing apparatus 33 to be fixed on the recording sheet so that the image is formed on the sheet. Thus, the recording sheet on which the image is printed is ejected into an ejection tray 50 provided on the top of the cabinet 1.

The feeding apparatus 34 feeds the recording sheet along a feeding path 53 from a sheet cassette 51 or a manual tray 52. The feeding path 53 passes between the intermediate transfer belt 40 and the transfer roller 46, and through the fixing apparatus 33 so as to reach the ejection tray 50.

The feeding apparatus 34 includes a pickup roller 54, a feeding roller 55, a resist roller 56, and an ejection roller 57. The recording sheet of the sheet cassette 51 or the manual tray 52 is forwarded sheet by sheet to the feeding path 53, and fed along the feeding path 53, and ejected to the ejection tray 50. While feeding this recording sheet, the image is printed on the recording sheet.

Moreover, a switchback feeding path 58 is provided for double sided printing. The recording sheet after fixing is fed by the feeding roller 55 through the switchback feeding path 58 into between the intermediate transfer belt 40 and the transfer roller 46. The recording sheet both sides of which have been printed passes through the fixing apparatus 33 to be ejected onto the ejection tray 50.

The operating section unit 4 is provided to the scanner section 10 and includes an operating section 60 and the display section 61. The operating section 60 includes various kinds of operating keys, and sets orientation information of a document and binding direction of a recording sheet. The display section 61 is made up of a liquid crystal display on which operating instructions and operation states in the operating section are displayed, and configured to be a touch panel. There are formed touch keys in an operating screen displayed on the display section 61, and these also function as operating keys.

Furthermore, the image processing apparatus of the present embodiment includes a communication section having a communication interface, which can be connected to a network such as a LAN and WAN. The network is connected to a plurality of external apparatuses (not shown). The external apparatuses include other image processing apparatuses, information processing apparatuses such as personal computers, and servers. The network is connected to the Internet from a router through a communication line such as a telephone line or optical fiber etc.

The control section 7 is made up of a microcomputer including a CPU, a ROM, and a RAM, and the CPU reads a control program stored in the ROM out to the RAM 18 to execute the control program. Thus, each section operates according to the control program. When image data is inputted from the image reading section 2 or the communication section, either one of a print mode, a copy mode, a scanner mode, and a facsimile mode is executed based on the processing condition contained in the input information from the operating section 60 or the header information of the image data inputted from the external apparatuses. Moreover, in the print mode and the copy mode, a single sided printing mode and a double sided printing mode are set as an ejecting processing mode. In the single sided printing mode, a face-up ejection for ejecting with a printing face being upward and a face-down ejection for ejecting with a printing face being turned down are set as ejection processing.

The control section 7 includes a main control section 11. The main control section 11 is the control section in the operating section unit 4, which executes synchronization and operation instructions between a sequence control section 15, a scanner control section 16, and a memory control section 17. In the main control section 11, key input of the operating section 60, and operation and display by a liquid crystal touch panel of the display portion 61 are controlled. The sequence control section 15 performs control of printing process and control of feeding recording sheets. The memory control section 17 stores an image read by a scanner in the RAM 18, and reads and outputs the image. Moreover, the memory control section 17 controls a main scanning direction and a sub scanning direction of a reading-out address for the RAM 18, thus making it possible to rotate the image at angles of 90, 180, and 270 to read it (rotation control).

Further, the control section 7 can switch a case where a portrait document (a vertically long document) is set as a standard mode and a case where a landscape document (a laterally long document) is set as a standard mode, by key operation from the operating section 60. In addition, on the basis of the instruction from the control section 7, the display section 61 differentiates the display contents when a portrait document (a vertically long document) is set as the standard mode and the display contents when a landscape document (a laterally long document) is set as the standard mode. That is, in image processing apparatuses installed in convenience stores, the standard in its industry is that A-4 documents are set laterally, and in image processing apparatuses for offices, a display mode for offices and a display mode for convenience stores are freely switched, so as not to cause A-4 documents to be set vertically. A specific example thereof will be shown in FIG. 3.

Figure 3:
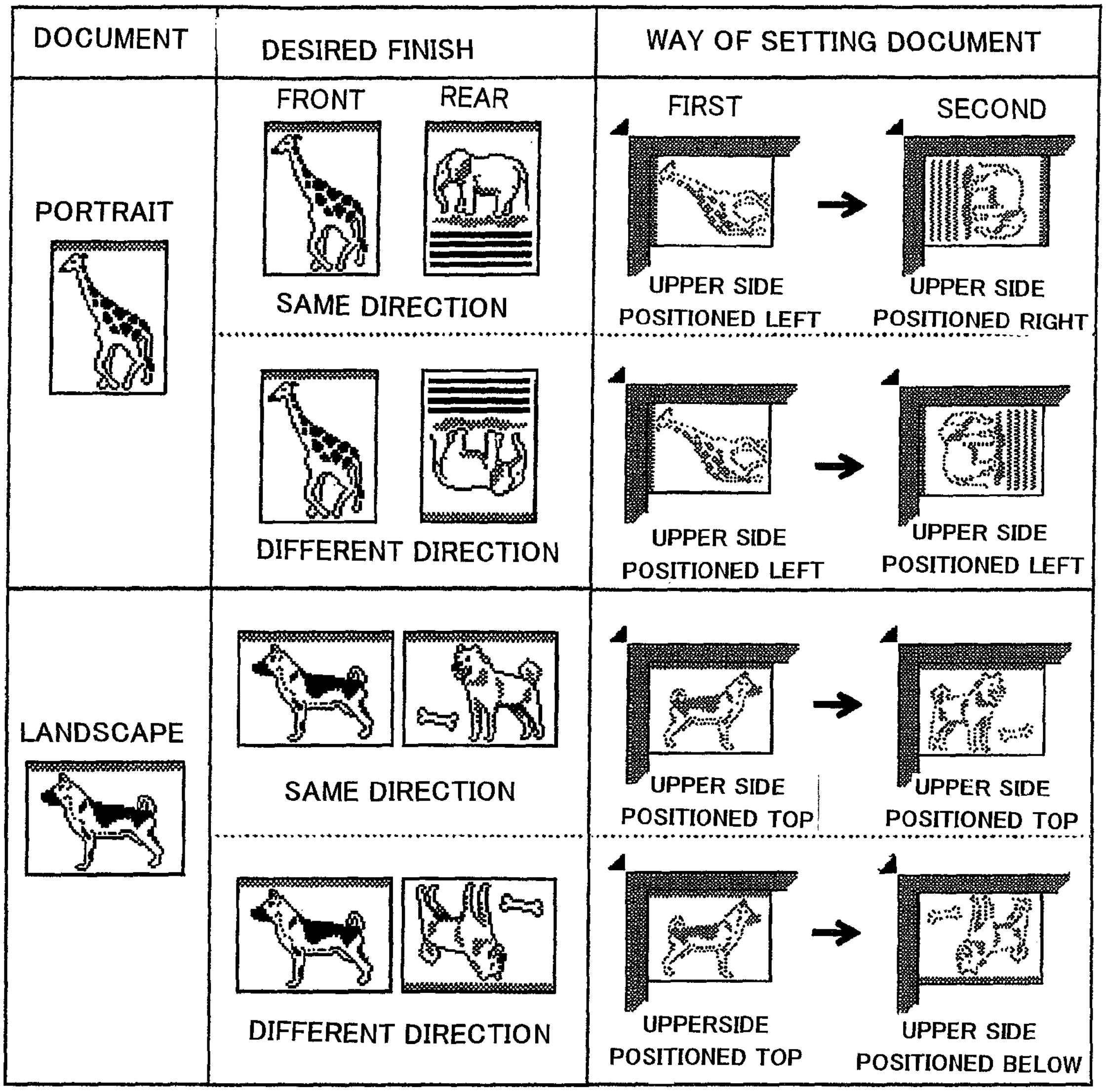
FIG. 3 is a schematic view showing orientations of documents, desired finish, and ways of setting documents in a mode of single sided document—double sided printing in the case of a multifunctional peripheral for offices (office machine model)
Figure 4:
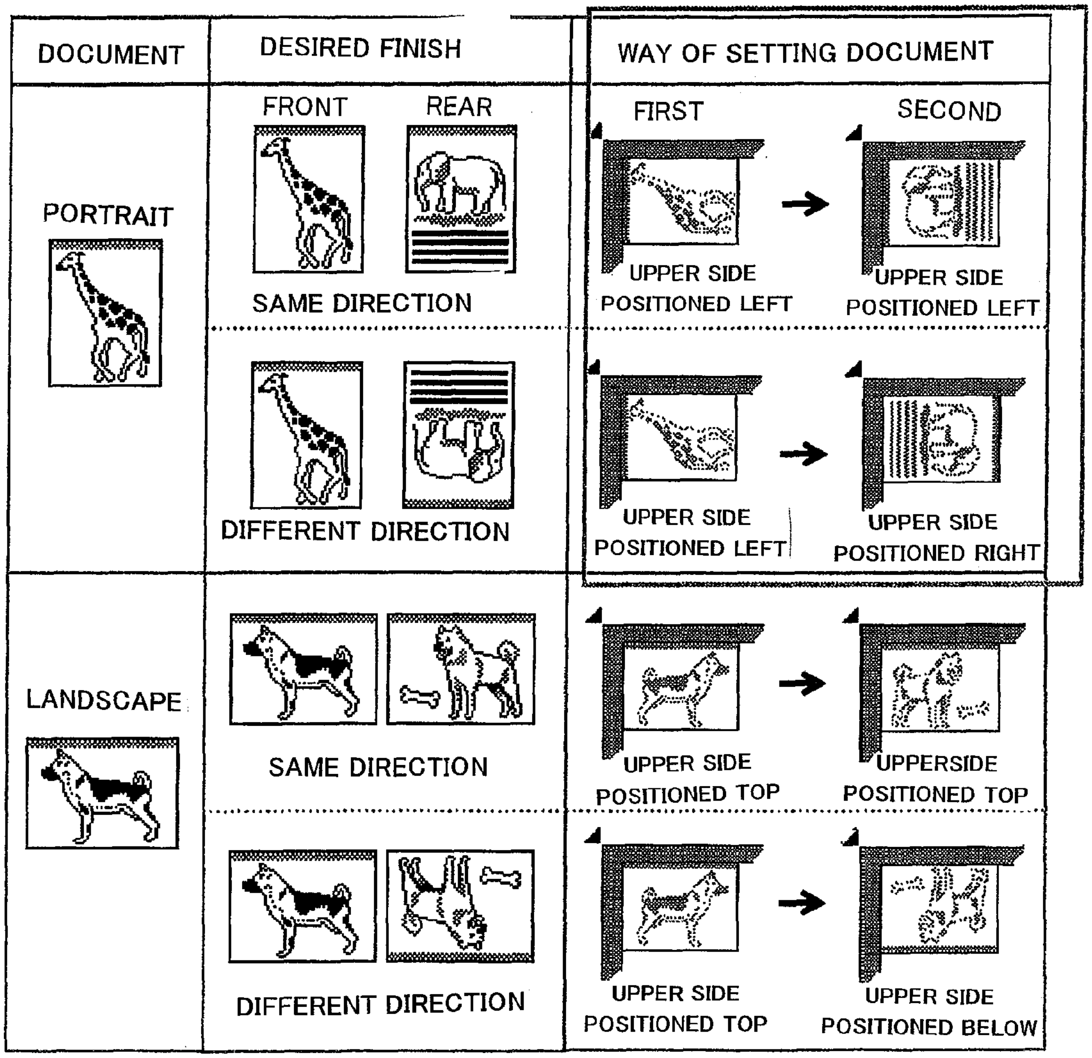
FIG. 4 shows a schematic view in the case where the multifunctional peripheral for offices in FIG. 3 is applied to a multifunctional peripheral installed in a convenience store.

FIG. 3 is a schematic view showing orientations of documents (left column), desired finish (middle column), and way of setting documents (right column) in a mode of single sided document—double sided printing, where FIG. 3 shows a schematic view in the case of a complex machine for offices (office machine model). FIG. 4 shows a schematic view in a case where the multifunctional peripheral for offices in the FIG. 3 is applied to a multifunctional peripheral which is installed in a convenience store.

It is to be noted that the way of setting documents is switched between FIGS. 3 and 4. The reason why the way of setting documents needs to be switched between FIGS. 3 and 4 is as follows; in a multifunctional peripheral for offices, it is standard that A4-documents are set vertically and basic specification is made based on this, and therefore, taking the schematic view in the uppermost row in FIG. 3 as an example, even when desiring to cause a front face and a rear face of a printed object to have a "same direction" as the desired finish (refer to the middle column), in a case where documents are actually set in a lateral direction, as shown in the right column, the documents need to be set so as to have "an opposite direction" with the upper side of the first document being on the left and that of the second document being on the right, thus it is very difficult for a user to understand intuitively.

However, in multifunctional peripherals installed in convenience stores, it is standard that A4-documents are set laterally, and therefore when using the method as shown in FIG. 3, it is very difficult to use for a user.

Hence, in the present invention, when a multifunctional peripheral is installed in a convenience store, as shown in the schematic view in the uppermost row of FIG. 4, rotation control for a document image is switched so that the desired finish ("same direction") is same as the way of setting documents ("set the first and second documents in a same direction").

Figure 5:
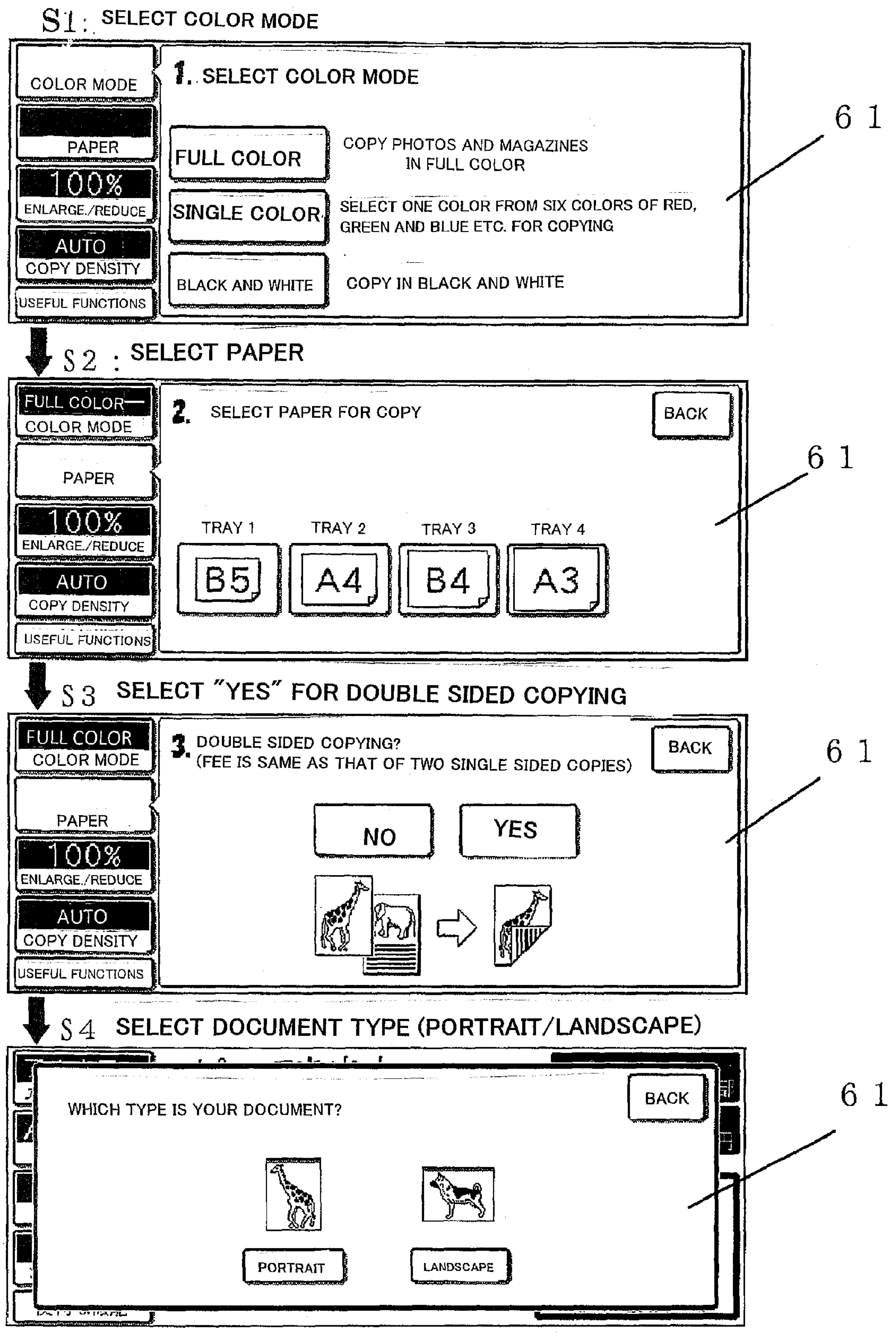
FIG. 5 shows a flow (S1-S4) in the display screen of the operating section of the image processing apparatus.
Figure 6:
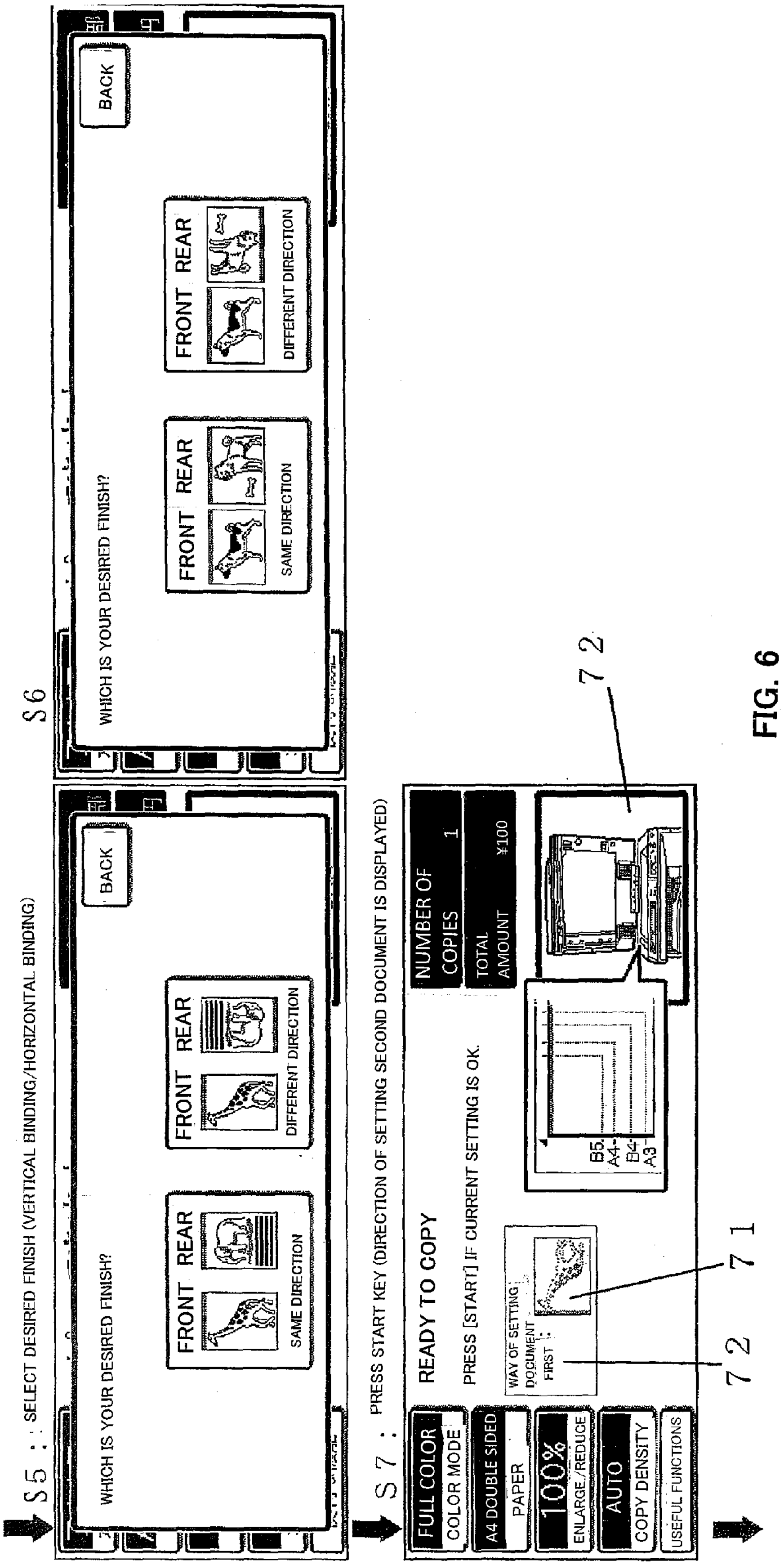
FIG. 6 shows a flow (S5-S7) in the display screen of the operating section of the image processing apparatus subsequent to FIG. 5.
Figure 7:
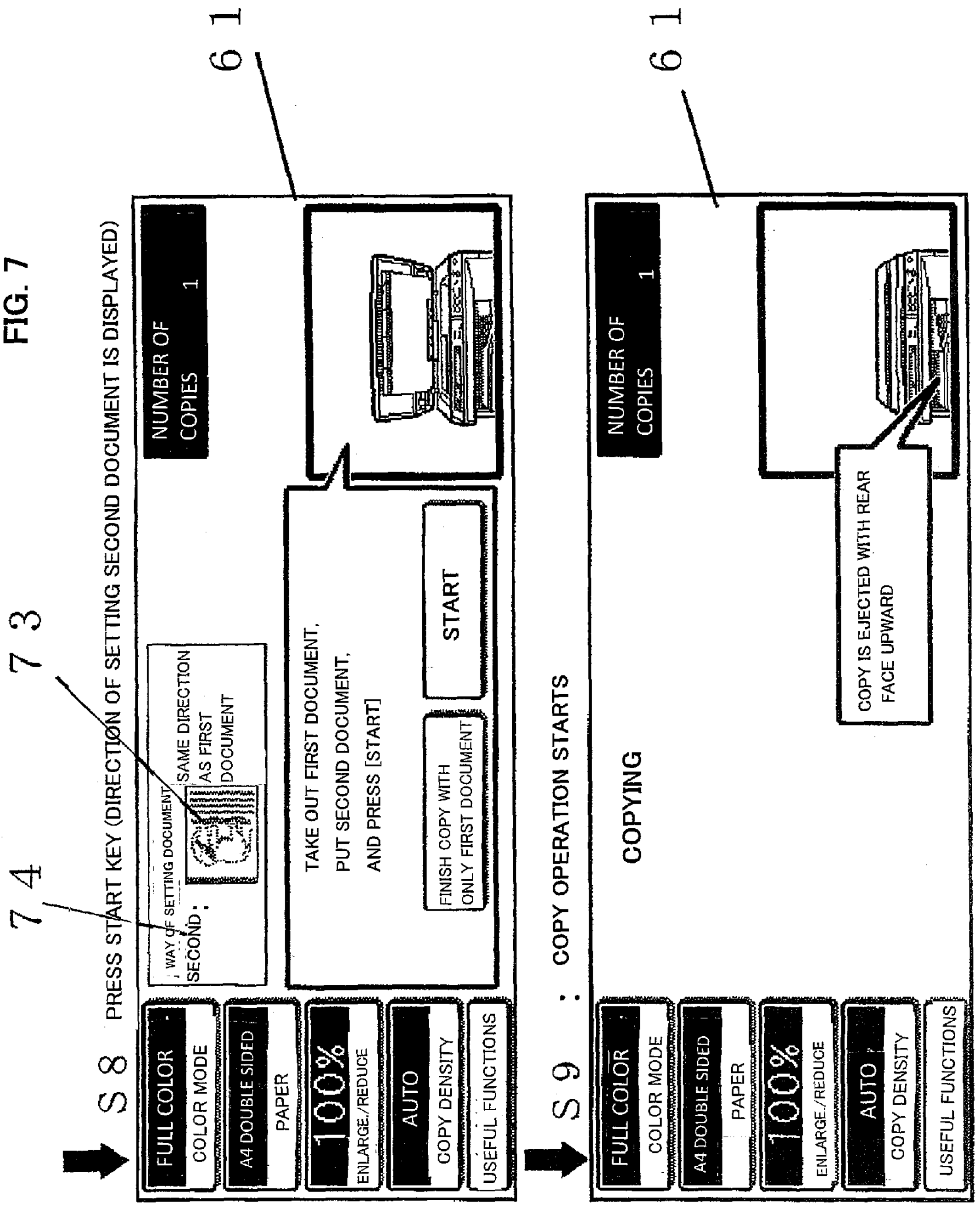
FIG. 7 shows a flow (S8-S9) in the display screen of the operating section of the image processing apparatus subsequent to FIG. 6.

FIGS. 5, 6 and 7 show a flow of a display screen which is switched by input instructions from a user, when single sided documents are subjected to double sided printing using the multifunctional peripheral for convenience stores shown in FIG. 4. In FIG. 5, S1 denotes an initial screen of the display section 61, in which a user selects a color mode herein. S2 denotes a state where the user selects a recording sheet (paper) (A4 is selected). S3 denotes a state where the user selects double sided printing. S4 denotes a selecting screen on which the user inputs a type of a document (portrait document/landscape document), and moving to S5 in the case of the portrait document, and moving to S6 in the case of the landscape document.

Here, it is further described when the portrait document is selected (S4 to S5). S5 denotes a screen in which, as the user-desired finish, a binding direction, that is, whether a front face and a rear face of a printed object have a same direction or different direction, is selected.

Here, when the "same direction" is selected, an icon 71 showing a direction of setting a first document on a document table in S7 is displayed. The icon 71 displayed in S7 corresponds to an image 72 of the document table displayed on the lower right side of the display screen, in which "the image 71 showing an orientation of the document and a message 72 showing the document is the first document" are displayed, so that the user can understand the direction of setting the document intuitively.

When the user depresses a start key in accordance with the message to cause the first document to be read, then a display screen showing a method for setting a second document is displayed on the display section 61, as shown in S8 of FIG. 7. In the display screen showing the method for setting the second document in S8, although an icon 73 which is similar to the icon of S7 in FIG. 6 is displayed, it is different herein in terms of the fact that "the document is the second document" (74) and "the document may be set in the same direction as that of the first document" are displayed on the display screen as the contents of the message. Thus, it is possible for the user to understand the direction of setting the document intuitively.

When the user depresses the start button in accordance with the message to cause the second document to be read, then the display screen is switched so as to show that the copy is being performed at S9 in FIG. 7, and an ejecting direction of the copy is displayed.

Figure 8:
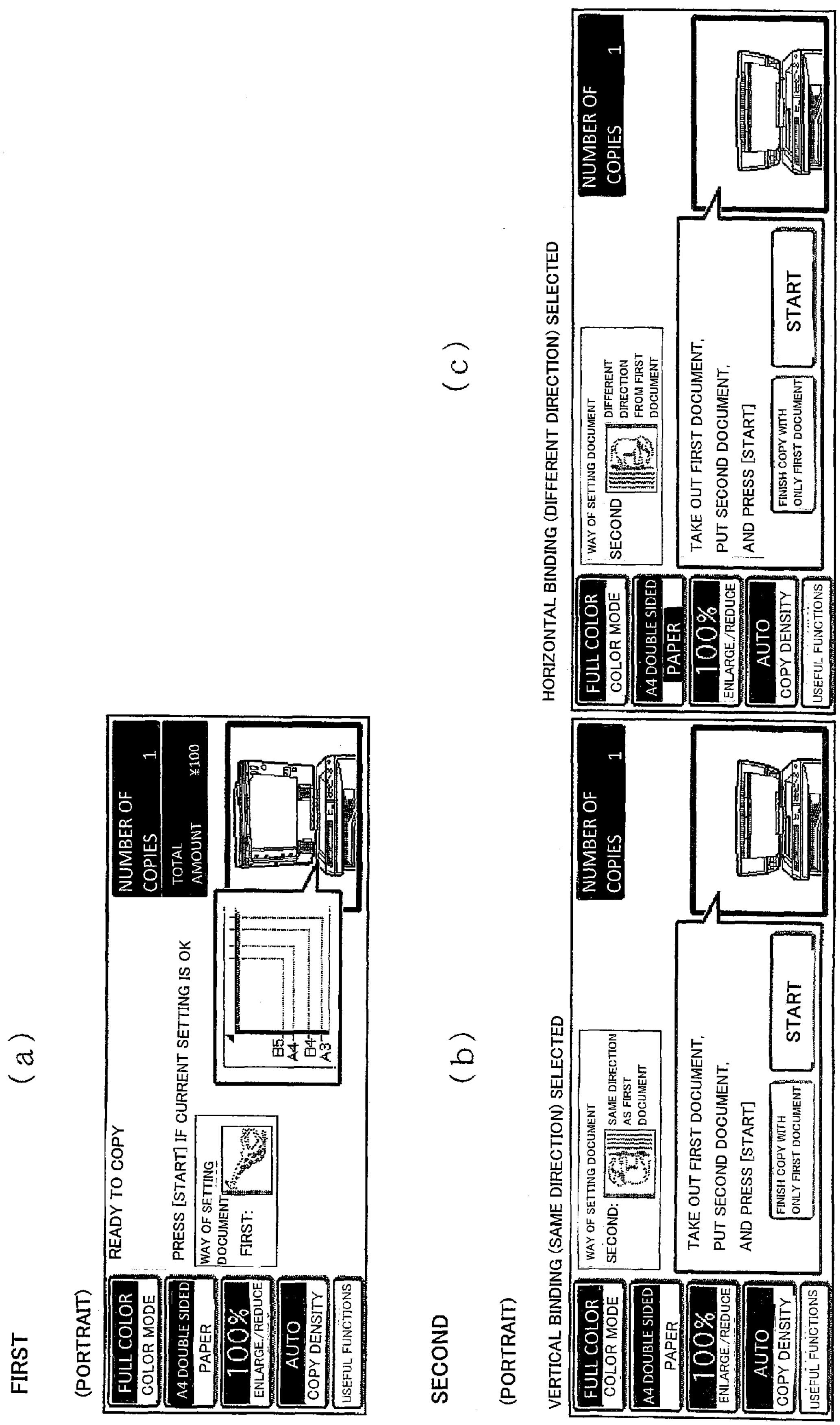
FIGS. 8 (*a*) to (*c*) shows an example guide display in a copy start screen with respect to a portrait document.

FIG. 8 shows a display screen including remaining patterns in FIG. 4, which are not selected by the user at S4 in FIG. 5 and S5 in FIG. 6. In FIG. 6, (a) denotes a case where the first document is a portrait document (vertically long document), (b) denotes a case where the second document is a portrait document (vertically long document) and the vertical binding (same direction) is selected, (c) denotes a case where the second document is a portrait document (vertically long document) and the horizontal binding (different direction) is selected. In a case where the second document is a portrait document (vertically long document) and the vertical binding is selected, as shown in FIG. 8 (*b*), it will be easy for the user to understand that the first document and the second document should be set on the document tray in the same direction. Likewise, in a case where the second document is a portrait document (vertically long document) and the horizontal binding (different direction) is selected, it will be easy for the user to understand that the first document and the second document are set so that the second one is upside down, as shown in FIG. 8 (*c*).

Figure 9:
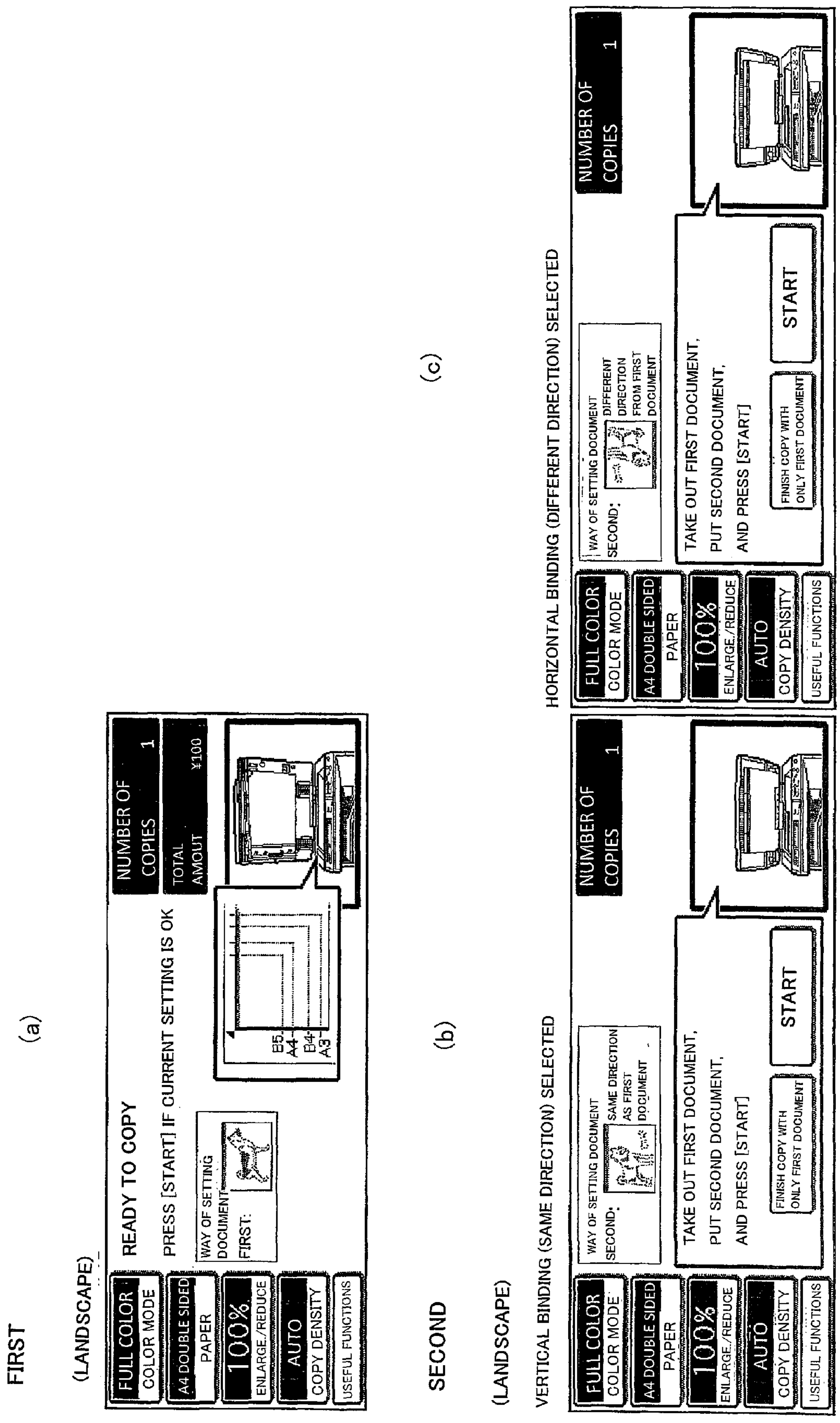
FIGS. 9 (*a*) to (*c*) show an example guide display in a copy start screen with respect to a landscape document.

Moreover, in FIG. 9, (a) denotes a case where the first document is a landscape document (laterally long document), (b) denotes a case where the second document is a landscape document (laterally long document) and the vertical binding (same direction) is selected, and (c) denotes a case where the second document is a landscape document (laterally long document) and the horizontal binding (different direction) is selected. In a case where the second document is a landscape document (laterally long document) and the vertical binding (same direction) is selected, as shown in FIG. 9 (*b*), it will be easy for the user to understand that the first document and the second document should be set on the document tray in the same direction. Likewise, in a case where the second document is a landscape document (laterally long document) and the horizontal binding (different direction) is selected, it will be easy for the user to understand that the first document and the second document are set so that the second one is upside down, as shown in FIG. 8 (*c*). In any guide display, the user is able to understand the direction of setting the document intuitively.

The present invention will not be limited to above described embodiments and many modifications and alternations can certainly be made to the above described embodiments within the scope of the present invention.

What is claimed is:

1. An image processing apparatus comprising:

a reading section for reading an image of a document;

an operating section for setting orientation information of the document and a binding direction of a recording sheet;

a display section for displaying an operation instruction and an operation state in the operating section;

an image forming section for forming the image on the recording sheet; and a control section for controlling the image forming section and the display section depending on an operating input from the operating section, wherein when two single sided documents are read and image data thereof is subjected to double sided printing on front and rear faces of the recording sheet, the control section causes the display section to display an image showing each setting direction of the documents and a message showing whether or not the setting direction of the documents is to be different between the first and second documents, at the time of reading the two single sided documents.

2. The image processing apparatus according to claim 1, wherein:

the image and the message are displayed as icons.

3. The image processing apparatus according to claim 1, wherein:

when two portrait documents are set so as to be subjected to a horizontal binding, the control section causes the display section to display to set upper sides of the two portrait documents in a same direction.

4. The image processing apparatus according to claim 1, wherein:

when the two portrait documents are printed on the front and rear faces of the recording sheet with the upper sides being in the same direction, the control section causes the display section to display to set the upper sides of the two portrait in the same direction.

5. The image processing apparatus according to claim 1, wherein:

the control section differentiates display content by the display section between a case where a portrait document is set as a standard mode, and a case where landscape document is set as the standard mode.

* * * * *